United States Patent [19]
Neely

[11] 3,759,533
[45] Sept. 18, 1973

[54] SEALING MEANS FOR ROTATING SHAFT
[76] Inventor: Willis A. Neely, 121 Levee View Dr., New Orleans, La. 70123
[22] Filed: Apr. 12, 1971
[21] Appl. No.: 133,087

[52] U.S. Cl................... 277/130, 277/136, 277/175
[51] Int. Cl......................... F16j 15/00, B65d 53/00
[58] Field of Search...................... 277/136, 137, 98, 277/142, DIG. 4, 130, 175

[56] References Cited
UNITED STATES PATENTS

| 2,638,363 | 5/1953 | Bryant | 277/237 A |
| 1,418,540 | 6/1922 | Darby | 277/237 A |
| 749,327 | 6/1904 | Sager | 277/130 |
| 609,121 | 8/1898 | Potter | 277/237 A |
| 2,908,516 | 10/1959 | Stein | 277/137 |
| 2,497,056 | 2/1950 | Nardulli | 277/175 |

Primary Examiner—Samuel B. Rothberg
Attorney—Calvin J. Laiche

[57] ABSTRACT

The present invention pertains to novel means for minimizing fluid leakage along the rotating shaft and the stationary members in conventional machinery such as pumps, compressors, and the like. Such machinery is generally provided with a sealing box positioned circumferentially around the rotating shaft wherein some form of sealing means is positioned. The present invention provides mechanical sealing means for positioning within the sealing box or housing of such machinery and comprises U-shaped members adapted to fit on the rotating shaft in such a manner so as to provide, in combination with the packing gland plate, means for minimizing fluid leakage along the shaft and between the plate and U-shaped members. Additional members are provided in combination with the U shaped members such that the forces involved will be unbalanced and the seal effected.

6 Claims, 10 Drawing Figures

PATENTED SEP 18 1973                                      3,759,533

INVENTOR.
WILLIS A. NEELY

SEALING MEANS FOR ROTATING SHAFT

BACKGROUND OF THE INVENTION

The present invention relates to devices, commonly referred to as mechanical seals, employed to minimize fluid leakage in fluid prime movers provided with a rotating shaft connected to the means acting upon the fluid, e.g., an impellar.

There are two methods commonly employed today to minimize fluid leakage along the shaft in conventional fluid prime movers incorporating a rotary shaft, for example, as in the case of a centrifugal pump or compressor. As is well known in the art, at the location where the rotating shaft exits from the stationary members of a pump or compressor, the problem exists of effecting a seal between the stationary housing of the equipment and its rotating shaft. The oldest and most commonly employed method to effect a seal in such equipment is to use what is generally known as soft packing. Exemplary of such materials are braided asbestos, cotton, flax, polymeric fibers, metal foil, graphite, and the like. Various other materials are quite often added to such materials to improve their performance, such as filling agents, lubricants, and the like. The packing is inserted in a stuffing box circumferentially provided around the rotating shaft. Pressure is applied to the soft packing usually by virtue of what is known as a packing gland. Fluid leakage along the rotating shaft is controlled by in turn controlling the clearance between the shaft and the packing which in turn is a function of the amount of pressure applied to the packing by the packing gland. Generally, in order to provide cooling and additional lubrication for the packing and the shaft, it is necessary to allow some leakage along the shaft. Otherwise, the packing will wear the shaft. The multitude of problems associated with soft packings, for example, the relatively excessive amount of leakage required for lubrication and cooling of the packing, as well as the wearing of the shaft and packing, have resulted in a constant thrust in the art away from such means for sealing a rotating shaft towards such devices commonly referred to as mechanical seals.

A mechanical seal as normally defined in the art generally comprises a rotating member which is affixed to the shaft and a stationary member which is affixed to the sealing box portion of the piece of equipment. These members are provided with sealing faces which are in intimate contact with each other to provide a dynamic seal. Stationary seals are provided between the shaft and the rotating member and also between the stationary seat and the gland and between the gland and the housing. In most conventional mechanical seals, the rotating portion affixed to the shaft is spring loaded to produce a force along the longitudinal axis of the rotating shaft to thereby force it into a sealing relationship with the seal positioned between such member and the stationary member. Consequently, sealing is accomplished by the combination of the spring loading plus the fluid loading. It is well recognized in the art that a mechanical seal will not only permit less leakage along a rotating shaft and thus minimize the attendant problems of a conventional stuffing box using soft packing, but additionally, will generally require less maintenance in the form of operator attention for adjustment and lubrication. However, the components of a mechanical seal assembly are made in integral parts which circumferentially fit around the rotating shaft thereby making it necessary to disassemble the piece of equipment in order to work on the seal.

Among the advantages and features of the present invention is that the leakage rates of a conventional mechanical seal is approached, yet the present seal can be readily disassembled without the necessity of disassembling the particular piece of equipment on which it is installed.

SUMMARY

The present invention provides a sealing means which basically comprises a first U-shaped member having a semi-circular inner surface adapted to mate with the peripheral surface of the rotating shaft on which the seal is to be installed. A second U-shaped member is provided which also has a semi-circular inner surface adapted to mate with the peripheral surface of the shaft. The members are positioned diametrically opposite so as to encompass the shaft. The second member is adapted to mate with the inner surface of the adjoining surface of the stationary member where the rotating shaft exits from the piece of machinery, generally referred to as the stuffing box which is provided with a packing gland plate. Resilient means are provided in combination with the U-shaped members for urging them into intimate contact with the rotating shaft as well as toward each other.

The second U-shaped member is preferably provided with a raised section which is adapted to fit within the extended leg portions of the first U-shaped member to prevent its relative rotation as well as support the leg portions. Floating spacer means is also provided which is adapted to seal off the open space defined between the extended leg portions of the second U-shaped member and the lateral surfaces of the first U-shaped member and the stationary member. This produces an unbalanced fluid force which urges the member toward the shaft. Means are also provided for preventing rotation of the seal assembly, yet to allow the assembly to move radially with the vibratory movement of the shaft.

Additional resilient spring means are provided for urging the U-shaped members toward the rotating shaft and the stationary packing gland plate. The U shaped members are preferably made of a chemically inactive material which should also exhibit thermal stability as well as good bearing characteristics, being preferably an aromatic polyester.

DESCRIPTION OF THE PREFERRED EMBODIMENT

Figures 1, 2:
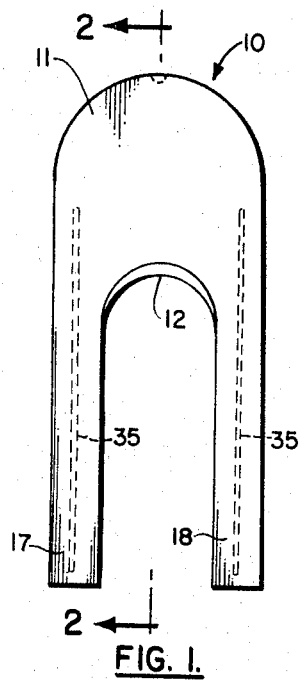
FIG. 1 in the drawing depicts a front view of one of the U-shaped members constituting one of the basic components of the present seal means.
FIG. 2 represents a sectional side view of the U-shaped member shown in FIG. 1 taken along the line 2—2.
Figures 3, 4:
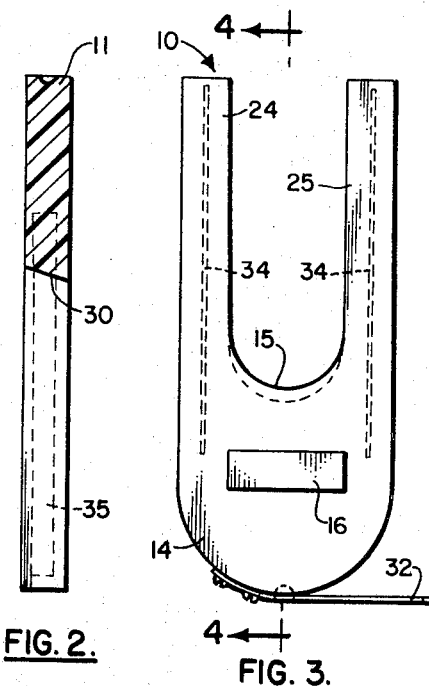
FIG. 3 depicts a front view of the other U-shaped member.
FIG. 4 represents a sectional side view of the U-shaped member shown in FIG. 3 taken along the line 4—4.
Figure 9:
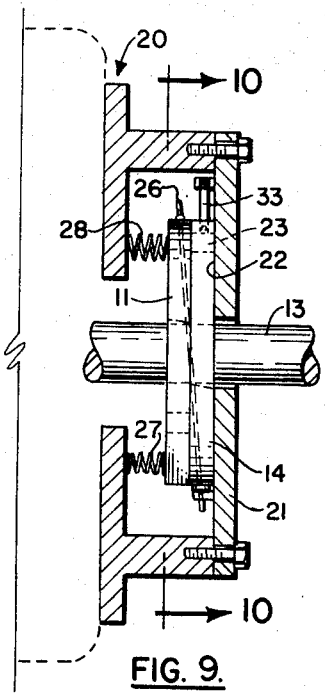
FIG. 9 depicts a partial view of the various components of the present invention, shown in section, as installed within the stuffing box of a conventional pump or compressor.
Figure 10:
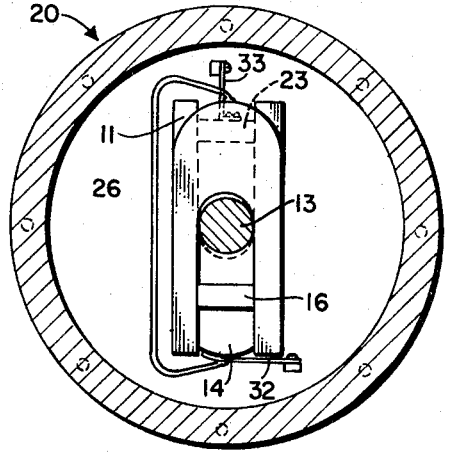
FIG. 10 represents a view of the arrangement shown in FIG. 9 taken along the line 10—10.

Referring to FIG. 1 in the drawings, the present sealing means 10 comprises the first U shaped member 11 which is provided with the inner semi-circular surface 12 which is adapted to fit over and mate with the peripheral surface of the rotating shaft 13 (see FIGS. 9 and 10). The member 11 provides a sealing relationship between its inner semi-circular surface and the rotating shaft. In such manner, the member 11 in combination with the various other components discussed in detail hereinafter forms a seal utilizing the same principal as a conventional mechanical seal, i.e., a combination of spring and fluid loading. The second U shaped member 14 is likewise provided with the semi-circular surface 15 which is adapted to fit around the peripheral surface of the shaft 13. The members 11 and 14 which are positioned diametrically opposite each other, in effect define a collar which encircles the shaft 13 to thereby form the seal preventing or minimizing fluid leakage along the shaft 13.

The second U-shaped member 14 is provided with the raised section 16 which is of a width and thickness such that it will slidably fit within the extended leg portions 17 and 18 of the member 12. The section 16 primarily serves as a support for the leg portions 17 and 18 as well as prevents relative rotation or relative motion between the U-shaped members 11 and 14. Of course, the section 16 can be made integral with or as a separate member suitably attached to the member 14. Additionally, the exact shape shown is not critical as long as its function is realized.

The U-shaped member is adapted to fit adajacent to the gland plate 21 of the fluid prime mover 20 in a sealing relationship. Since the design of the plate 21 will vary considerably with different types of equipment, it may be necessary to machine the internal surface 22 of the plate 21 or provide an adapter gland plate for use with specific equipment.

Figure 5:
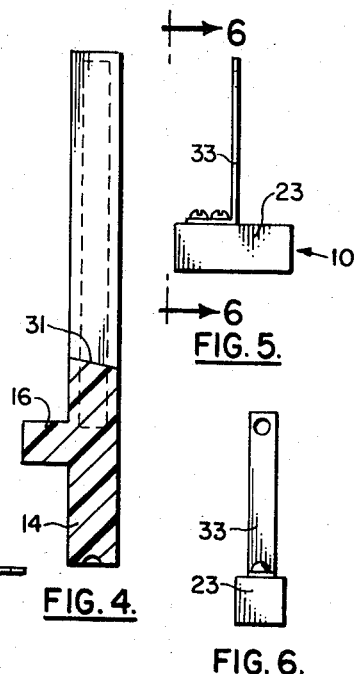
FIG. 5 depicts one manner of securing the spacer means employed in conjunction with the U-shaped member of FIG. 4 to the stationary housing of a piece of equipment on which the present seal has been installed (see also FIG. 9).
Figure 6:
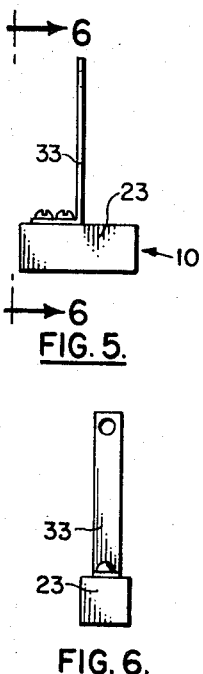
FIG. 6 represents a side view of the spacer means shown in FIG. 5, viewed along the line 6—6.

The spacer 23 (FIG. 5) is provided primarily for sealing the open end of the U shaped member 14 as shown in FIG. 9. This produces an unbalanced fluid force in the radial direction to urge the member toward the shaft. The spacer 23 is adapted to slidably fit between the extended leg portions 24 and 25 of the member 14. The member 23 is of the same width as the U-shaped member 14 whereby said members 11 and 14 are in an operable position, the member 23 positioned between the member 11 and the gland plate 21, seals the open end of the member 14. In such manner as shown in FIGS. 9 and 10, the members 11, 14 and 23 in cooperation with the gland plate 21 forms a seal assembly around the rotating shaft 13 and between it and the stationary components of the prime mover 20.

Figure 7:
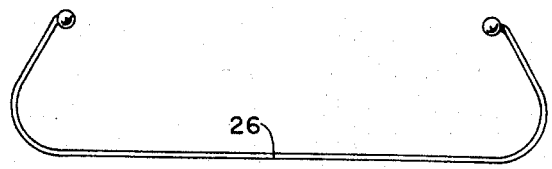
FIG. 7 depicts a side view of the spring means employed in conjunction with the U-shaped members of FIGS. 1 and 3 for constantly urging said members toward each other when in an operable relationship.
Figure 8:
FIG. 8 represents a top view of the spring shown in FIG. 7.

Referring to FIG. 9, the U shaped resilient spring means 26 (as shown in detail in FIGS. 7 and 8) is provided for urging the U-shaped members 11 and 14 toward each other into intimate contact with the shaft 13. The resilient spring means 27 and 28 are provided for urging the seal assembly toward the gland plate 21. The combination of the mechanical load imparted by the springs 26, 27 and 28 and the fluid load in the axial direction and the combination of the mechanical load imparted by the fluid load in the radial direction achieves, in principal, many of the distinct advantages due to the same reason or effect as realized in a conventional mechanical seal.

As shown in FIG. 1, 2, 3 and 4, the U shaped members 11 and 14 are preferably initially provided with the beveled inner surfaces 30 and 31. This feature of construction is preferred since it compensates for manufacturing tolerances, that is, it compensates for the difference in the diameter of the shaft 13 and the inner diameters of the U-shaped members 11 and 14, viz. that of the surfaces 12 and 15. This allows these members to wear rapidly in position to conform to the exact shape of the peripheral surface of the shaft 13. This effect is realized since the forces across the U-shaped members are maximized under such circumstances. Normally, the maximum force exerted on either member is equal to the pressure exerted by the fluid medium multiplied by the diameter of the shaft times the thickness of the member, plus the spring loading. Where the U-shaped members are beveled, the unit pressure over those surfaces is greater due to the reduced surface area of contact which thereby causes greater or more rapid wearing. This allows these members to wear into a perfect fit with the outer peripheral surfaces of the shaft 13. It is important that the U-shaped members fit flush or parallel with the rotating shaft so as to suppress or prevent the build up of hydrodynamic forces along these surfaces which are created by the spinning shaft. These forces if allowed to build up, tend to lift the U shaped members from the shaft thus destroying the seal. In any event, the interfaces between the U-shaped members and between them and the rotating shaft must be polished to maximize sealing efficiency. It can be appreciated that the amount of the force applied on the U-shaped members is primarily a function of their thickness for a given piece of equipment, assuming a constant fluid pressure and a constant spring loading.

The shaft 13 naturally produces vibratory motion due to mechanical imperfections which commonly occur in both the axial and radial directions. If the seal assembly were to be rigidly attached to the stationary members, then the shaft would wear an opening in the U-shaped members of a diameter greater than that of the shaft. In order to eliminate this effect, the entire seal assembly is allowed to travel with the vibratory movement of the shaft. The assembly is kept from rotation partly by virtue of the connecting means 32 which is preferably a flexible spring steel member, one end of which is tangentially attached to the butt portion of the U-shaped member 14 (by suitable means not shown) and its other end to the equipment casing. In the arrangement depicted in FIG. 9, the member 32 will allow the U-shaped member 11 and 14 to track with the vertical component of the radial vibrations of the shaft 13. Conversely, the connecting member 33 will permit the horizontal movement of the seal assembly to compensate for the horizontal component of the radial vibrations of the shaft 13. The member 33 is connected to the member 23 by suitable means, e.g., screws and the like, and its other end being connected to a stationary portion of the equipment.

The U-shaped members 11 and 14 and the member 23 are constructed of materials having good bearing qualities, which are chemically inactive, and thermally stable. Polymeric materials are preferred since they exhibit these properties, especially filled polytetrafluorethylenes, and particularly aromatic polyesters, e.g., the material known as Ekonal which is a trade designation employed by The Carborundum Company. Where the material of construction of the U-shaped members lack a high degree of resiliency, it is preferred to provide the leaf spring members 34 and 35, respectively, embedded therein, see FIGS. 1,2,3 and 4. These means serve both to stiffen the extended leg portions of the respective members as well provide a spring loading on the members which fit between the extended leg portions of the respective U-shaped members which in combination with the fluid loading serves to provide a pressure seal between these members. It can be appreciated by one skilled in the arts that variations can be made in the design of the present sealing means and its adaption to various equiment without departing from the true scope and intent of the present invention. For example, the member 23 can be allowed to ride upon the shaft 13. Or, the member 23 can be made integral with the U-shaped member 11, similarly as in the case of the design of the member 14. Accordingly, the scope of my invention is that as set forth in the appended claims.

I claim:

1. Sealing means for minimizing fluid leakage between the rotating shaft and the stationary members of a fluid prime mover, said means comprising:
   a. a first U shaped member having a semi-circular inner surface adapted to mate with the peripheral surface of a rotating shaft;
   b. a second U-shaped member also having a semicircular inner surface adapted to mate with the peripheral surface of a rotating shaft, said second U-shaped member being adapted to mate with the inner surface of a stationary member of a fluid prime mover where the rotating shaft exists therefrom and with said first U-shaped member in a diametrically opposed relationship so as to encompass a rotating shaft when said U-shaped members are operably installed thereon; said second U-shaped member being further defined in that it is provided with a raised section positioned on its portion opposite its open end and adjacent to said first U shaped member, said section being adapted to slidably fit within the extended leg portions of said first U shaped member so as to prevent relative rotation between said members as well as support the extended leg portions of said first U-shaped member;
   c. resilient means for urging said U shaped members toward each other and a rotating shaft on which said members are operably installed; and
   d. spacer sealing means adapted to slidably fit between the extended leg portions of said second U-shaped member to seal the open end thereof as well as support said extended leg portions.

2. The sealing means of claim 1 further characterized in that:
   said U-shaped members are further defined in that they are provided with beveled surfaces over their respective semi-circular inner surfaces.

3. The sealing means of claim 2 further characterized as comprising:
   e. resilient spring means for urging said first U-shaped member toward said second U-shaped member.

4. The sealing means of claim 3 further characterized in that: said U-shaped members are constructed of an aromatic polyester which is chemically inactive, thermally stable and exhibits good bearing properities.

5. The sealing means of claim 4 further characterized in that:
   said U-shaped members are further defined in that elongated resilient spring means are embedded in their extended leg portions to impart rigidity thereto.

6. The sealing means of claim 5 further characterized as comprising:
   f. first anchoring means for connecting said second U-shaped member to a stationary member of a fluid prime mover on which said sealing means is installed, one end of said anchoring means being tangentially connected to the outer peripheral surface of said second U-shaped member and its other end to the stationary member to thereby prevent the seal assembly from rotating and to permit the assembly to move vertically with the vertical component of the radial vibration; and
   g. second anchoring means for connecting said spacer sealing means to a stationary member, said anchoring means extending in a plane positioned essentially 90° to that defined by said first anchoring means to thereby permit the assembly to move horizontally with the horizontal component of the radial vibration whereby both first and second anchoring means allow said sealing means to move both radially and axially with the vibratory movement of the rotating shaft.

* * * * *